Figure 1:
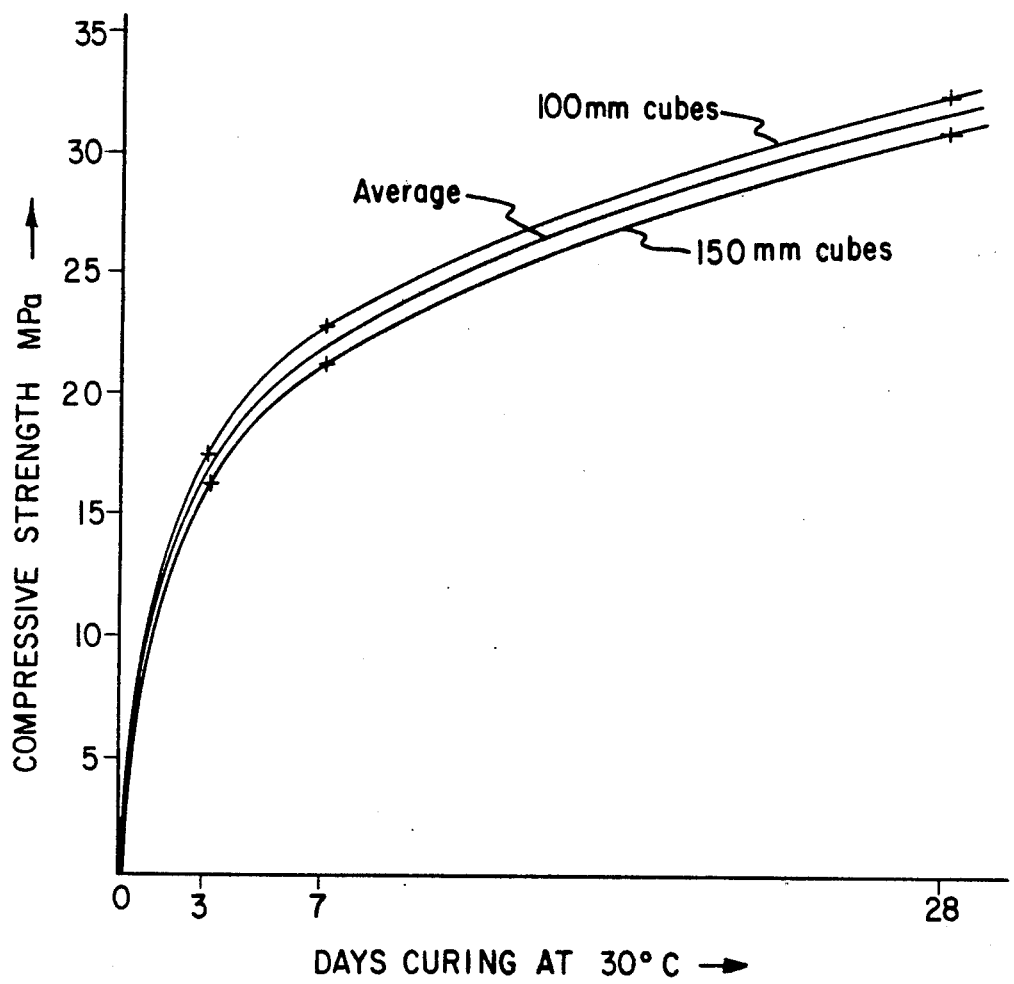

United States Patent [19]

Keogh

[11] 4,249,954

[45] Feb. 10, 1981

[54] POZZOLANIC PRODUCT PRODUCED FROM BAGASSE ASH

[76] Inventor: Boyd T. Keogh, 4 Adrian Pl., Balgowlah Heights, New South Wales, Australia, 2093

[21] Appl. No.: 951,082

[22] Filed: Oct. 13, 1978

[30] Foreign Application Priority Data

Oct. 14, 1977 [AU] Australia .................. PD2067

[51] Int. Cl.$^3$ ................................. C09C 1/28
[52] U.S. Cl. ................................. 106/288 B; 106/97
[58] Field of Search ............... 106/97, 288 B, DIG. 1

[56] References Cited

U.S. PATENT DOCUMENTS

| | | | |
|---|---|---|---|
| 3,951,907 | 4/1976 | Mehta | 106/288 B |
| 3,957,528 | 5/1976 | Ott et al. | 106/DIG. 1 |
| 3,959,007 | 5/1976 | Pitt | 106/288 B |
| 3,991,005 | 11/1976 | Wallace | 106/288 B |

*Primary Examiner*—James Poer
*Attorney, Agent, or Firm*—Darby & Darby

[57] ABSTRACT

A product adapted for use as a filtration material, absorption material, or as a pozzolanic material in the production of concrete, is produced from unprocessed sugar mill boiler ash by crushing and optionally screening the unprocessed ash and then grinding the crushed ash. Alternatively, unprocessed ash may be screened to remove particles of a size greater than desired. The grade of the product may be controlled by removing fine particulate material from the ground ash and then recombining the separated materials in desired proportions.

6 Claims, 8 Drawing Figures

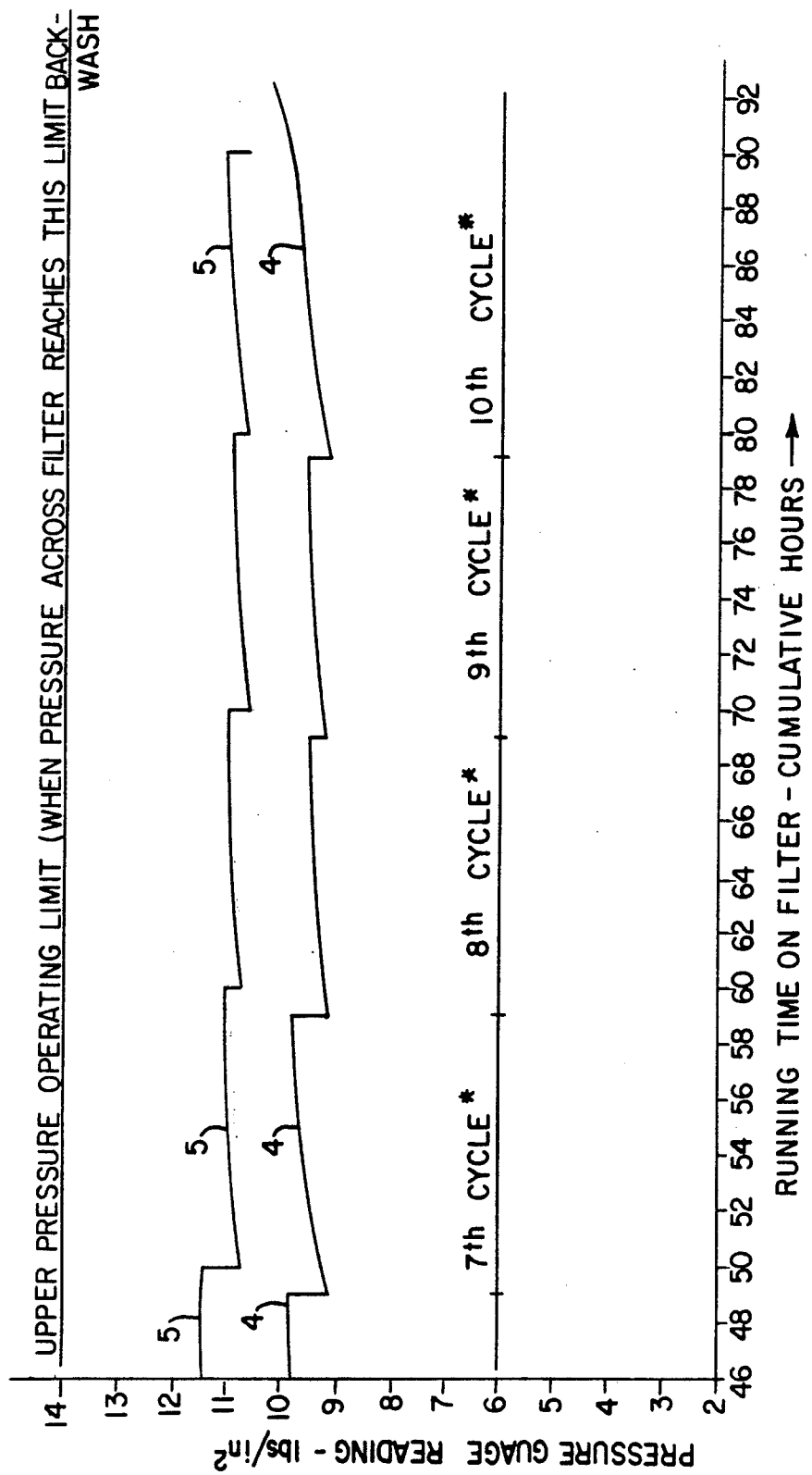

POZZOLANIC PRODUCT PRODUCED FROM BAGASSE ASH

This invention relates to an improved multi-purpose product—and to further products and processes comprising, or utilising (as appropriate), such product. More specifically, there is provided by the invention a new product, which is derived from sugar mill boiler ash—which ash results from the burning of sugar cane residues (or bagasse as such residues are generally designated in the art) obtained in the extraction of sugar from sugar cane.

In the conventional process of extracting sugar, when cane stalks are subjected to crushing et al in a sugar mill, the cane residues or bagasse (the latter term will be exclusively used hereinafter, for convenience) become(s) available in substantial quantities—and it has been a problem of the art to find suitable uses for this low value by-product material. Such uses have included the manufacture of paper and certain building materials; however, as a matter of developing practice, the principal use has become the employment of such material as a fuel for the sugar mill boilers. Bagasse (of typical analysis sugar 3%, fibrous material 50%, water 47%—percentages by weight) fed to sugar mill boilers burns to an ash which is made up of undergrate or furnace ash (of low carbon, and unburnt or partially burnt, fibre content) and fly ash (which, because it tends to be carried away in the gas stream before combustion is fully completed, can be of significantly higher carbon and such fibre content). It is with this sugar mill boiler ash—which has normally been viewed as a waste product and accordingly discarded (apart from some restricted use as a soil conditioner and as a rather poor quality lightweight aggregate in the manufacture of concrete and in road construction)—that the present invention is concerned.

The invention is predicated upon my surprising discovery that processed sugar mill boiler ash possesses valuable properties as a pozzolanic material (making it particularly useful in the building art) and also as a filtration and/or filler material (whereby it can be employed in a variety of domestic and industrial situations). It will be appreciated that, apart from the positive advantages that obviously flow from the development of a new product so endowed, the invention, by providing an efficacious usage of material previously categorised as waste, has most pronounced economic advantages and environment-enhancing overtones.

In one broad aspect, there is provided by the invention a new product, adapted for use as a pozzolanic material, a filtration material and/or a filler material, the said product comprising sugar mill boiler ash which has been processed—as by (i) drying, crushing and screening as (or if) appropriate, and (ii) grinding to an appropriate fineness. In a further aspect, the invention provides a process for the production, from sugar mill boiler ash, of such a product. In further more specific aspects, as will become apparent hereafter, the invention includes within its ambit pozzolanic, filtration et al materials comprising such a product, and also related processes involving its utilization. Finally, in modifications of its filtration aspect, the invention comprehends my further discoveries that (i) partially processed, and also unprocessed, sugar mill boiler ash can be employed as a substitute for the known (more expensive) prior art materials, and (ii) filtration material can be controllably produced from sugar mill boiler ash by varying the proportion of fine particles in the end product.

Figure 4:
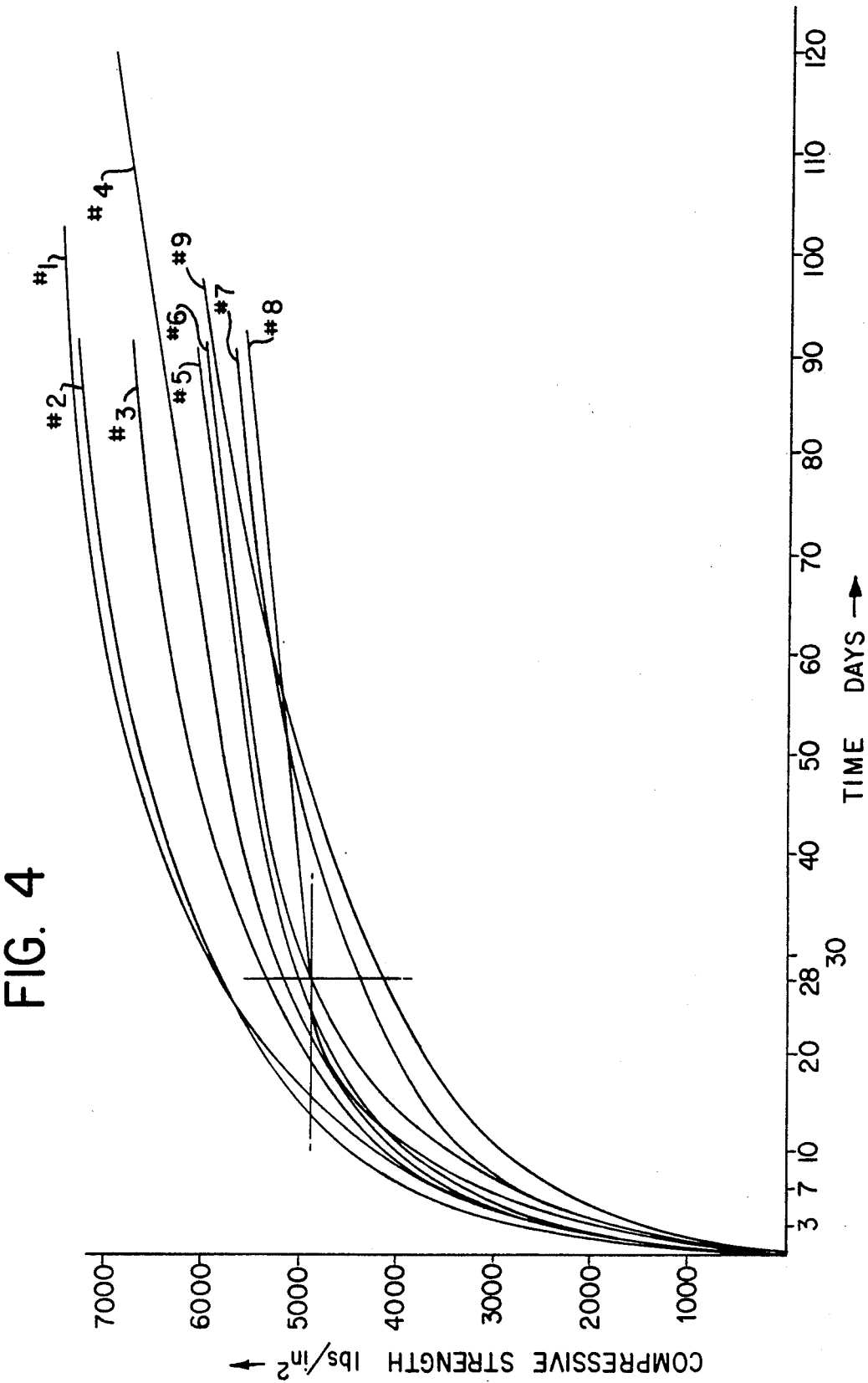
Figure 5:
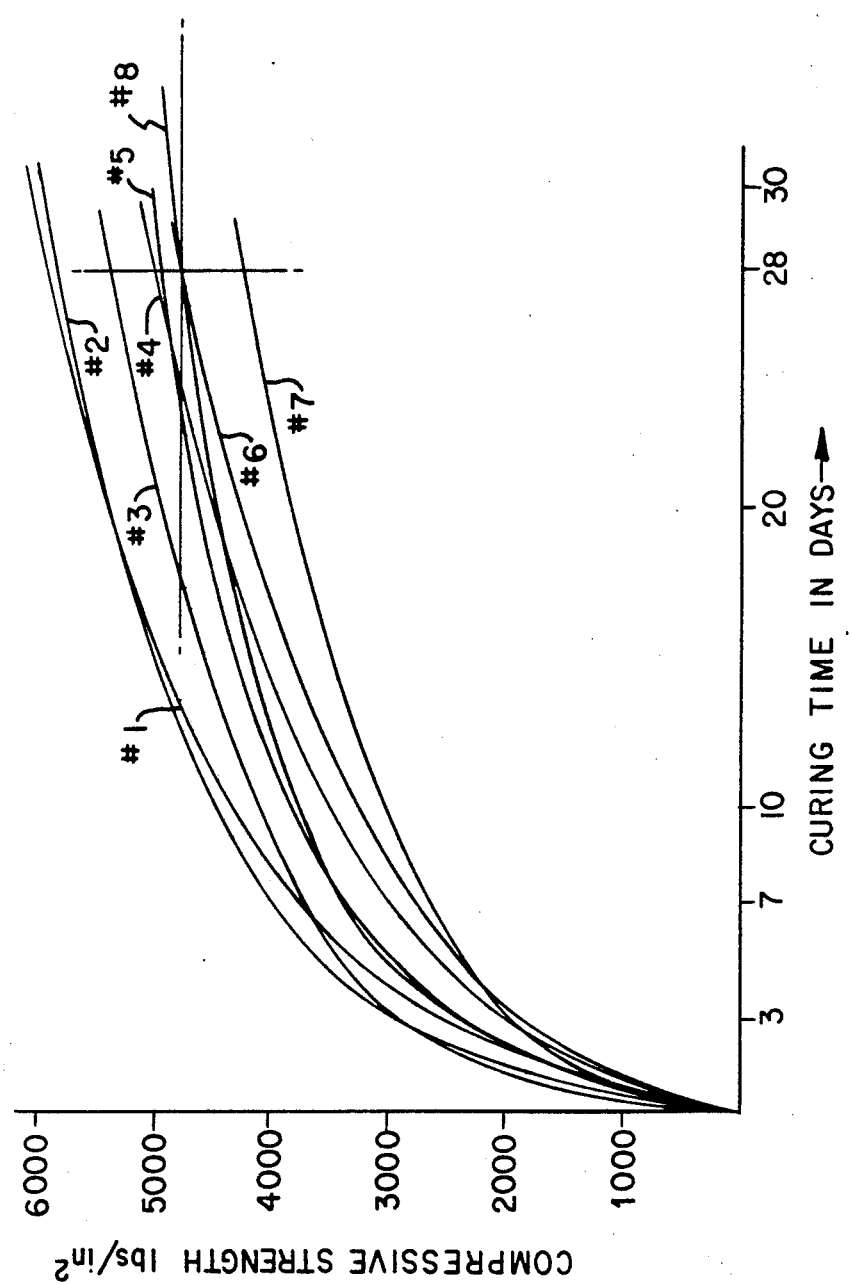
Figure 6A:
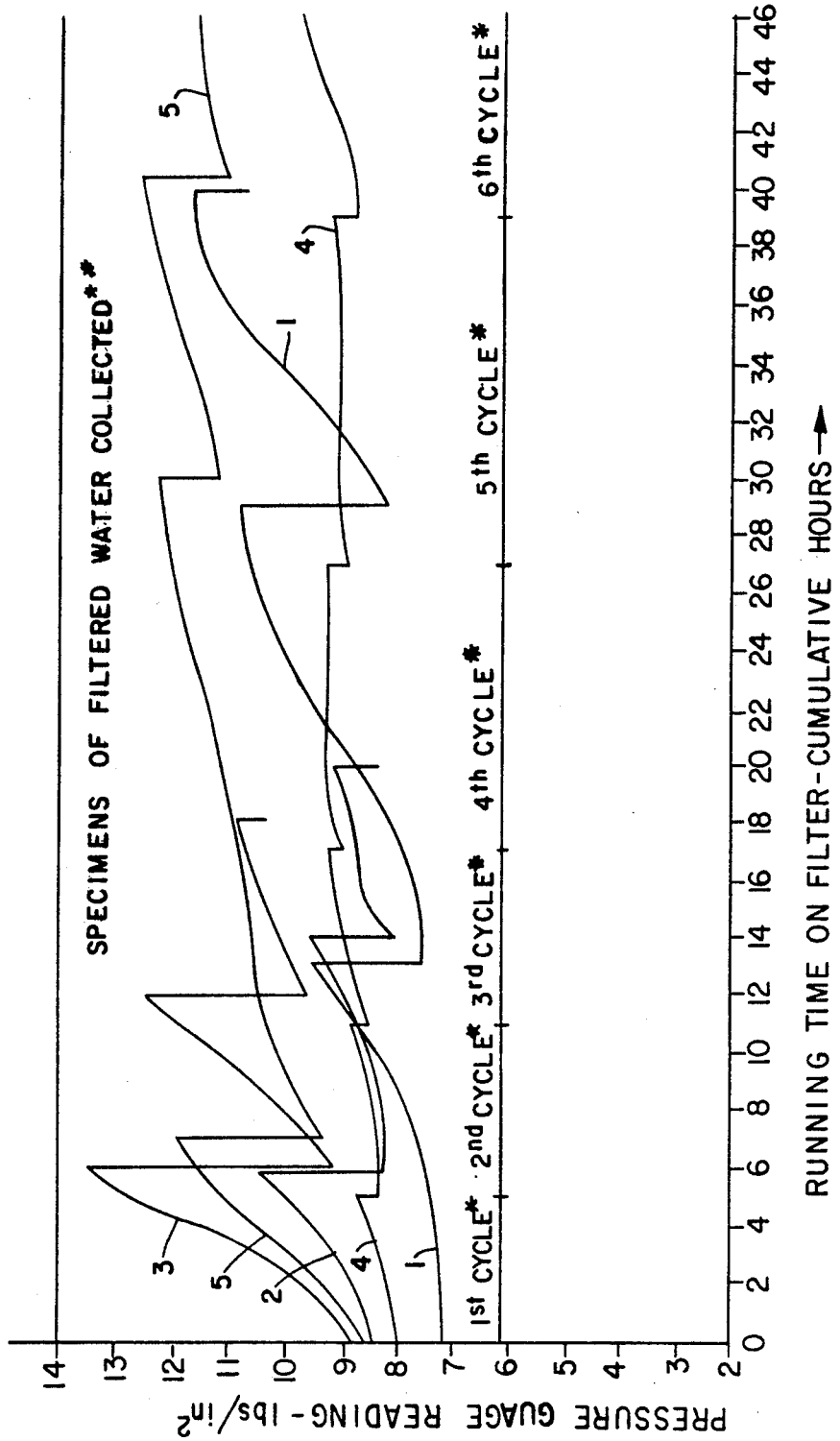
Figure 6C:
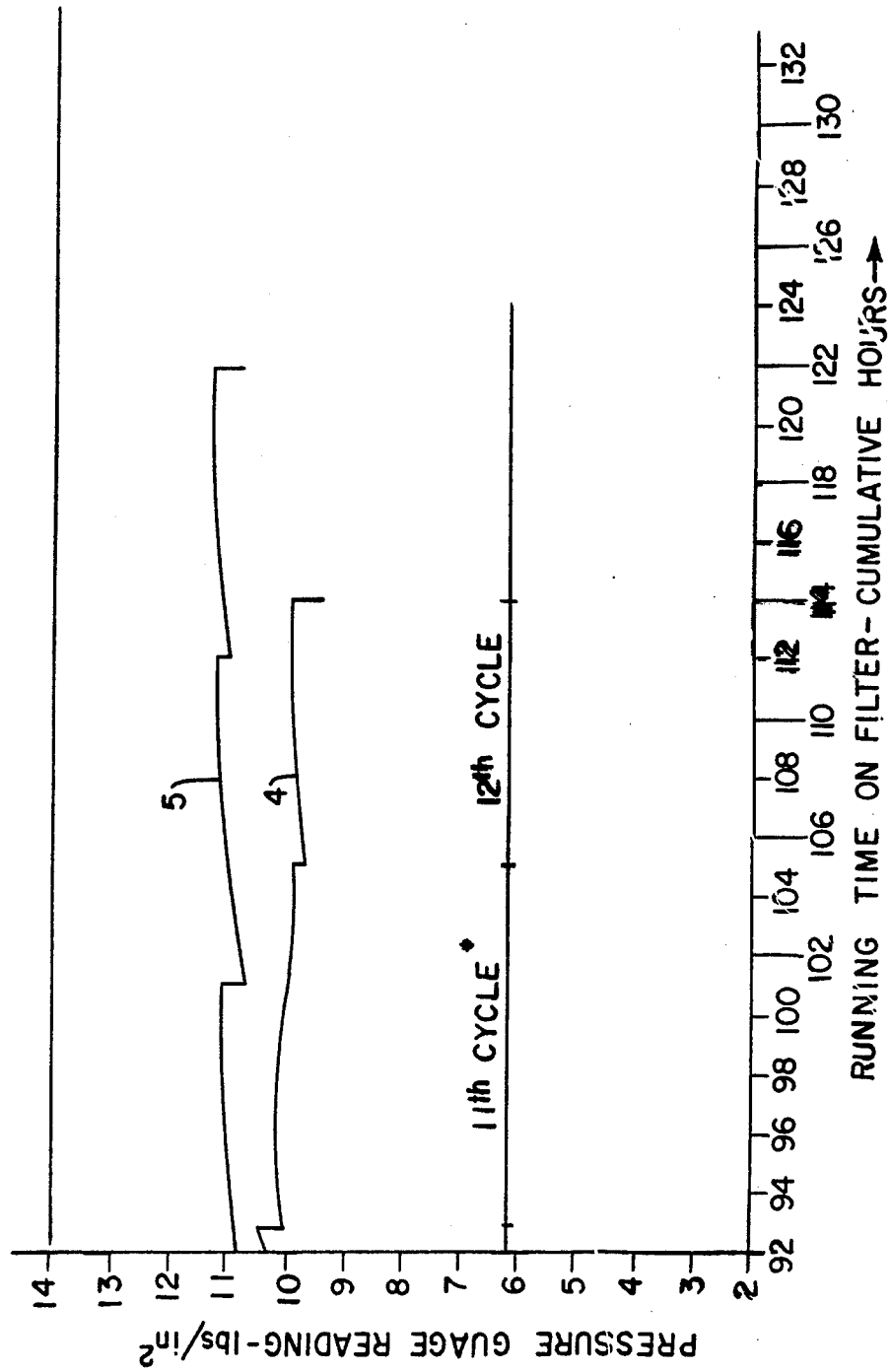

FIGS. 1–5 represent concrete strength development curves for various concrete batches manufactured in accordance with the invention; and FIGS. 6A–6C illustrate comparative filters and tests for samples made in accordance with the invention.

The invention will now be sequentially described with reference to (A) preferred sub-generic features, and (B) specific numerical examples. As a prelude to such ensuing description, it is emphasised that the details set forth are merely intended to be illustrative of the invention—and hence are not to be limitatively construed. Unless otherwise specifically stated, all percentages indicated hereafter are by weight.

(A) In carrying out the invention, the processing of the sugar mill boiler ash (e.g. drying, crushing and screening, followed by grinding) may be performed on an ash of the following typical (for pozzolanic material) analysis:

| | |
|---|---|
| $SiO_2$ | 73% |
| $Al_2O_3$ | 6.7% |
| $Fe_2O_3$ | 6.3% |
| CaO | 2.8% |
| MgO | 3.2% |
| $P_2O_5$ | 4.0% |
| $Na_2O$ | 1.1% |
| $K_2O$ | 2.4% |
| loss on ignition | 0.9% |

Desirable supplementary criteria in respect of the processed (pozzolanic-intended) ash are that (i) the combined content of $SiO_2$, $Al_2O_3$ and $Fe_2O_3$ should not be less than 70%

(ii) the MgO content should not exceed 5%

(iii) the loss on ignition should not exceed 10%.

Detail-wise, the sugar mill boiler ash—following preliminary crushing, in conventional crushing equipment, as and if desired—may be screened through a sieve of (e.g.) 4.75–5 mm opening (or other size appropriate to the further processing steps to be performed), the material passing therethrough being immediately available for further processing. The over-size material retained thereon (viz. cane fibres in variously burnt condition, carbonaceous material and inorganic slag-like material) is either disposed of (as waste) or, in the case of the inorganic material, recrushed and rescreened as required (other impure extraneous material(s) can be conventionally removed). Further processing preferably takes the form of grinding and classifying—in a dry state or as a wet slurry as desired (and as elaborated hereafter)—to a fineness (particle size) represented by a specific (high) surface area of at least 200–300 square meters (e.g. 500–1000 square meters) per kilogram. The sugar mill boiler ash so processed—constituted by fine particulate material—constrasts markedly with the coarse-particled form of the unprocessed ash.

Elaborating with further respect to the pozzolanic aspect of the present invention, and by way of definition-type characterisation thereof, a pozzolan (or pozzolana or pozzolanic material) is normally defined as a material which, on its own, has no cementing property, but which in the presence of lime and/or cement and water develops such a property—and thus itself acts as a cement. Such materials, which are normally grouped into natural and synthetic pozzolanas, are therefore normally employed as an admixture with, or a partial replacement for, portland cement in the manufacture of concrete or concrete products; additionally, they find employment in conjunction with lime and/or cement in the stabilization of roads, and the preparation of road base material.

As indicated heretofore, I have discovered that, unlike the unprocessed ash, the processed sugar mill boiler ash of this invention (ground as above so that the ash particles having a significant specific surface area), possesses the physical properties of a pozzolanic material. The processed ash, in an embodiment of one aspect of this invention, is blended with a conventional portland cement, with the ash becoming an admixture with and/or partial replacement therefor. Specifically, a thus-blended ash-cement may be exemplified as one with an ash content in the range 10-35% (e.g. 20-30%), or more, by weight. Such a product, when used in the manufacture of concrete, achieves strengths comparable to those exhibited by concretes made by 100% portland cement.

The invention also envisages alternatives to the concrete-manufacturing procedure set forth immediately heretofore. In one such alternative, the ash, in a dry and as yet unprocessed form, may be blended with portland cement clinker—the latter being partially replaced by the ash—and the blend may be interground in a conventional cement mill (in other words, the processing of the ash, and its mixing with cement, are carried out simultaneously rather than sequentially). In another alternative, the processed ash, instead of being premixed with the cement, may be batched directly, in a concrete manufacturing plant, with the cement and appropriate aggregates.

A noteworthy property of the pozzolana (or pozzolanic material) resulting from the processing of sugar mill boiler ash is that the pozzolanic reaction obtained, on mixing with portland cement in concrete, is significantly greater when the concrete is cured at elevated temperatures. This property has especial value in the manufacture of those concrete produces where curing is carried out at an elevated temperature, frequently by the use of steam, and sometimes in an autoclave. For example, where a 75-25 portland cement/ash blend can result in comparable 28 day compressive strengths of concrete cured at ambient temperature to that produced from 100% portland cement, blends of (e.g.) 60-40, or 50-50, portland cement/ash can produce extremely satisfactory concrete products cured at temperatures in the vicinity of 70°-80° C.

The hydro-thermal reaction produced at these elevated temperatures between the pozzolanic material and the lime resulting from the hydration of portland cement, results in a very high early strength in the concrete product.

The processed sugar mill boiler ash is usually very light in comparison with the weight of portland cement—and hence it enables the manufacture of lightweight concrete products with many technical advantages. Because the processed mill ash possesses the pozzolanic properties described above, it can also be used in the production of pozzolanic road base materials and in the stabilization of roads.

A further aspect of the invention relates to domestic and industrial filtration and/or absorbent materials and processes. At present, minerals such as diatomaceous earth, diatomite, infusorial earth, tripolite and kieselughr are commonly used as a filter media or filter aids in a variety of domestic and industrial processes (for example, finely powdered diatomaceous earth is used to pre-coat the filter elements in swimming pool filters, to aid in the filtration of the water pumped from the pool and returned to the pool after filtering). Other applications involve utilization of the absorbent characteristics of such material e.g. as an absorbent for nitroglycerine in the manufacture of dynamite.

I have also discovered that the processed sugar mill boiler ash of the invention (with its particles of capilliary needle like skeleton shape) is eminently suitable as an effective substitute for the filtration and/or filler materials presently known in the art. Accordingly, in this aspect, the invention also comprehends (a) a filtration, filter, and/or absorbent material comprising processed sugar mill boiler ash as herein defined (b) a process wherein a material to be filtered, or a filter element to be employed in a filtration process, is treated or precoated (as respectively appropriate) with a processed sugar mill boiler ash as herein defined (c) an absorbtion process wherein a material to be treated is treated with a processed sugar mill boiler ash as herein defined.

To cater for varying filtration requirements in industrial processes, the present state of the art makes use of filtration materials and filter aids of various grades. These grades indicate the ability of these materials (and aids) to filter liquids at different speeds whilst maintaining the other desirable characteristics of such materials.

In another aspect of the invention, I have discovered that the filtering speed of filtration materials (and filter aids) produced from sugar mill boiler ash, can be altered and controlled (so as to produce various grades of filter aid) by adjusting the proportion of very fine particles retained in the product material (e.g. those particles smaller than 12 to 20 microns). Accordingly, in this aspect, the invention provides a filtration material comprising processed said sugar mill boiler ash, which ash is further characterised by a content of fine particulate material of particle size smaller than 12 to 20 microns. In its related process aspect, the invention provides a process of preparing this material which is characterised by drying, crushing and screening as required (as recited heretofore), grinding to an appropriate fineness, removing the fine particulate material (e.g. those particles smaller than 12 to 20 microns) and recombining as required.

As indicated heretofore, a modification of the invention in its filtration et al aspect—wherein there is employed partially processed, and unprocessed, sugar mill boiler ash in the filtration processes and as a substitute for the known filtration and/or filler materials—is also envisage. In such modification, the extraneous material (removed as by crushing and screening as previously indicated) may be partially (at least) retained, a suitable upper particle size cut-off point, with only particles above such cut-off point removed, being 212 microns (150 microns exemplifies a lower cut-off level). In this general connection, it is mentioned that retention of a quantity of carbon can indeed be advantageous where the process is one directed towards the filtration and purification of water and certain other liquids.

Utilization of the product in accordance with some aspects of the invention may require that it be sterilized. If this is so, sterilization may be effected in accordance with techniques well known in the art.

(B) The foreshadowed specific numerical examples are now set forth. It is to be understood that where details are not given (e.g. in respect of the duration and temperature of heating in Example 1), such details are within the common knowledge of those skilled in the art.

EXAMPLE 1: Dry Pozzolanic Material

A 2 kilogram representative sample of unprocessed sugar mill boiler ash, from the burning of bagasse in the boilers of the Puuenene and Paia mill in the Hawaiian Islands, was dried on a hotplate to remove all moisture.

The sample was screened through a 5 mm sieve, and oversize inorganic slaglike material was crushed to pass the 5 mm sieve. Oversize organic plant material, (bagasse fibres), was discarded.

The minus 5 mm material was dry ground in a laboratory ball mill for approximately 40 minutes, until the fineness of the ground material was such that 95% of the ground material passed through a 45 micron sieve. The specific surface area of this ground material was measured as 535 square meters per kilogram.

This ground material represented a dry pozzolan powder.

EXAMPLE 2: Pozzolanic Slurry Material

A duplicate 2 kilogram representative sample of unprocessed sugar mill boiler ash, to that described in Example 1 above, was prepared in the same manner as for Example 1, preparatory to grinding, except that the material was not dried. The moisture content of the prepared sample was measured and found to be 10%.

Water was added to this sample in such quantities that a slurry consisting of 60% ash and 40% water was available for wet grinding. This slurry was wet ground in a laboratory ball mill for approximately 40 minutes, until the fineness of the ground ash particles was such that 95% of the ground material passed through a 45 micron sieve. The specific surface area of this ground material was measured as 535 square meters per kilogram on a dry basis.

The pulp resulting from this wet grinding process represented a pozzolan slurry containing 60% pozzolan particles and 40% water.

EXAMPLES 3 to 5: Cementitious Material

To demonstrate that the products described in Example 1 and 2 possessed good pozzolanic properties, they were used as a partial replacement for portland cement in a standard concrete mix designed to produce a concrete with a compressive strength after 28 days curing, of 30 megapascals (MPa).

The components in the mix design expressed in kilograms of material per cubic meter of concrete, were as follows:

|  | Kilograms/Cubic Meter. |
| --- | --- |
| Cementitious Material | 300 |
| Nepean River Sand | 380 |
| Cronulla River Sand | 380 |
| Crushed River Gravel 20 mm | 860 |
| Crushed River Gravel 10 mm | 210 |
| Water | 195 |

Three batches of concrete were produced in a laboratory concrete mixer to the above mix design, and the cementitious material consisted of 80% by weight of portland cement (Type A) and 20% by weight of dry pozzolan particles produced in the manner described in Examples 1 and 2.

In the first batch (Example 3), the cement was combined with the dry pozzolan powder produced in Example 1 above, and agitated to ensure adequate blending of the two components of this cementitious material prior to its introduction to the concrete mixer (R.M.C. Ltd. Mix 3 Concrete Test Series 80/20 Blend Ref. Cement/Po22 Slurry #085 Wet Agitated).

In the second batch, Example 4, the cement was combined with the pozzolan slurry produced in Example 2 above, and agitated to ensure adequate blending of the two components of this cementitious material prior to its introduction to the concrete mixer (R.M.C. Ltd. Concrete Test Series Mix No. 4 80/20 Blend Ref. Cement/Po22 Slurry #805 wet blended in mixer). The total amount of water used in this batch was adjusted to compensate for the water contained in the pozzolan slurry.

In the third batch, Example 5, the cement and pozzolan slurry (produced as in Example 2 above) were not first combined, but were separately batched directly to the concrete mixer. The total amount of water used in this batch was adjusted to compensate for the water contained in the pozzolan slurry.

From each batch, concrete specimens were cast into 100 mm and 150 mm cubes. These specimens were cured at a controlled temperature of 30° C., and one of each of the 100 mm and 150 mm cube specimens were crushed at 3, 7, and 28 days curing respectively, to determine the compressive strength of the concrete specimens.

The compressive strengths of all specimens were plotted and curves drawn through the average of the compressive strengths for 100 mm and 150 mm cubes at 3, 7, and 28 days curing to illustrate the compressive strength development of the concrete containing the pozzolanic materials produced in Examples 1 and 2 above.

Figure 2:
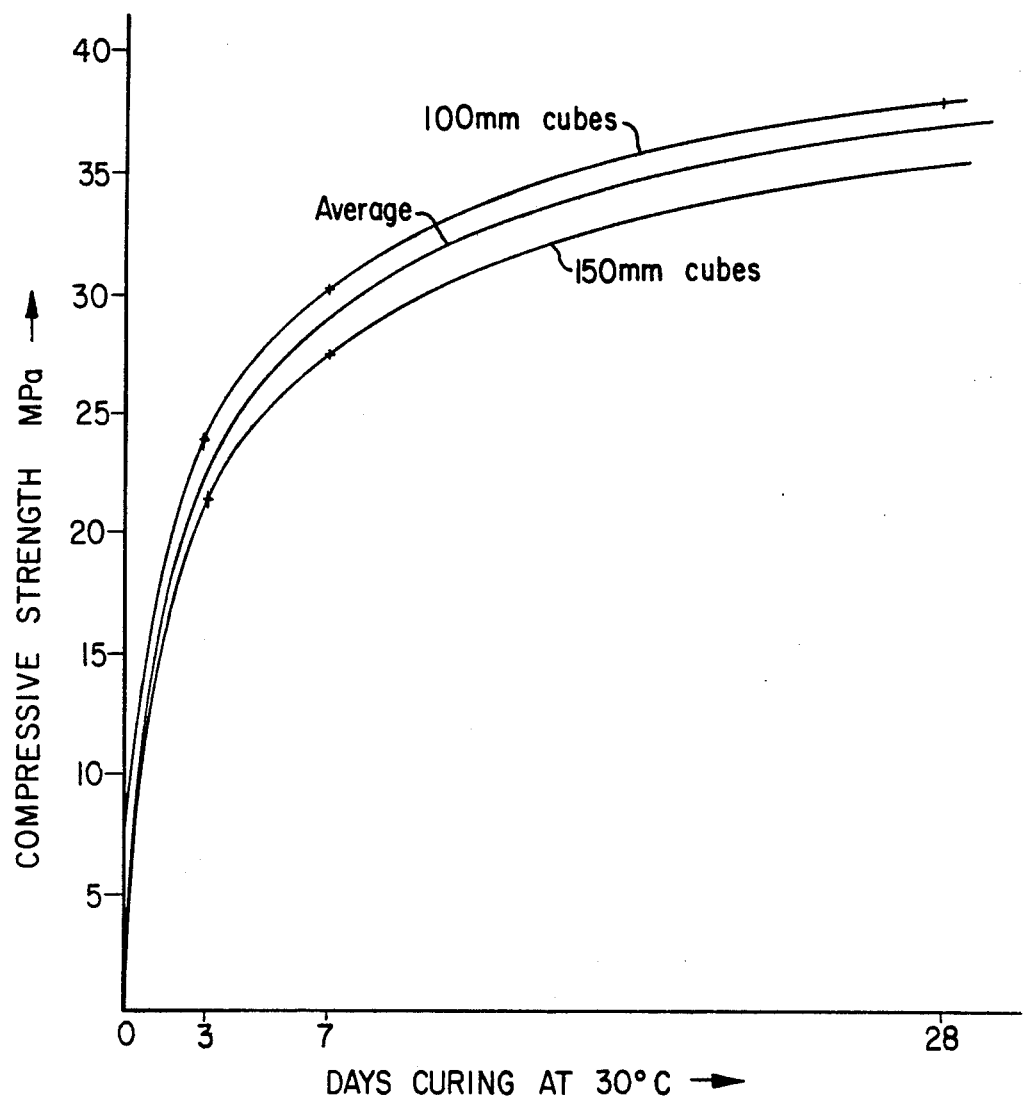
Figure 3:
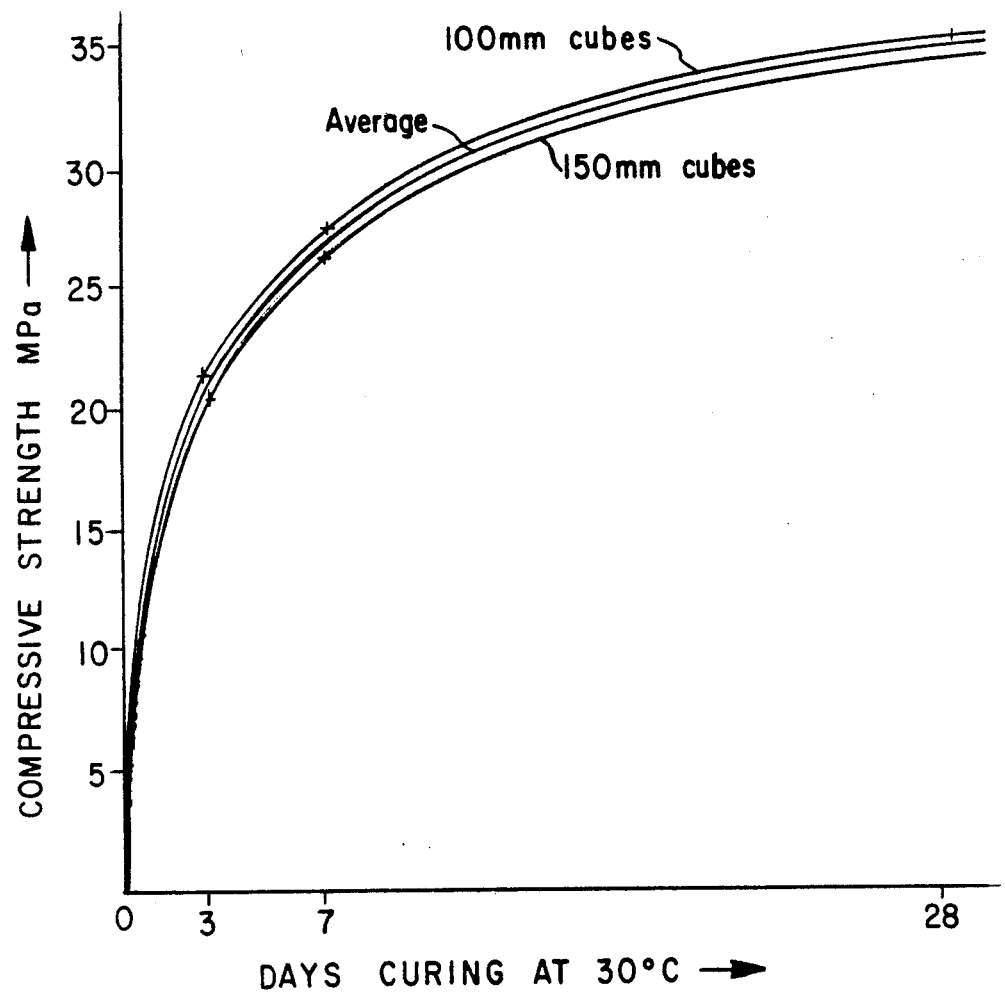

These strength development curves for each batch are respectively shown in FIGS. 1 to 3.

The strength development curves for the first batch (Example 3) are illustrated in FIG. 1, for the second batch (Example 4) in FIG. 2, and for the third batch (Example 5) in FIG. 3.

The compressive strengths were as follows:

| Assumed Average Compressive Strengths | | % Average Reference Strength |
| --- | --- | --- |
| FIRST BATCH (Example 3) | | |
| 3 Days | 16.9 MPa | 85% |
| 7 Days | 22.3 MPa | 87% |
| 28 Days | 31.8 MPa | 96% |
| SECOND BATCH (Example 4) | | |
| 3 Days | 23.0 MPa | 116% |
| 7 Days | 29.1 MPa | 113% |
| 28 Days | 37.0 MPa | 111% |
| THIRD BATCH (Example 5) | | |
| 3 Days | 20.7 MPa | 105% |
| 7 Days | 26.5 MPa | 103% |
| 28 Days | 35.0 MPa | 105% |

In each case the 28 day strength exceeded the design requirement of 30 MPa, and the strength development throughout compared favourably with average "Reference Strengths".

Note: Average "Reference Strengths" were the average compressive strengths of 100 mm and 150 mm cube concrete specimens made from the same mix design and cured under the same conditions, except that the cementitious material consisted of 100% type A portland cement without any pozzolan.

From these examples, it is manifest that a highly satisfactory pozzolanic reaction was obtained between the cement and the pozzolanic products made in Examples 1 and 2. The products and the processes used to produce them, have great economic value.

EXAMPLES 6 to 13: Interground Cementitious Material

To produce a cementitious material by blending sugar mill boiler ash and cement clinker and processing the blend simultaneously rather than sequentially, a number of ash samples were prepared and interground with cement clinker as follows:

A total of eight representative samples of unprocessed sugar mill boiler ash were collected, such ash resulting from the burning of bagasse in the boilers of the following sugar mills.

| Example No. | Sample No. | Sugar Mill | Country |
|---|---|---|---|
| 6 | 058 | "Stella" | Reunion |
| 7 | 085 | "Puunene & Paia" | Maui, Hawaiian Islands |
| 8 | 052 | "Frome" | Jamaica |
| 9 | 078 | "Mt. Edgecombe" | South Africa |
| 10 | 050 | "Rarawai" | Fiji Islands |
| 11 | 061 | "Brittania" | Mauritius |
| 12 | 053 | "Amatikulu" | South Africa |

In each case, the ash samples were dried on a hotplate and then screened through a 5 mm sieve. Oversize inorganic slaglike material was crushed to pass through the 5 mm sieve, whilst oversize organic plant material, (bagasse fibres), was discarded.

In each case a fraction of the minus 5 mm material was combined with (Type A) portland cement clinker and gypsum as follows, to produce a 70/30 "intergrind" sample.

| | |
|---|---|
| 2016 | grams pre-crushed clinker |
| 864 | grams minus 5 mm ash |
| 120 | grams gypsum |
| 3000 | grams Total |

In the case of ash sample 085, a further (eighth) fraction (Example 13) of the minus 5 mm material was combined with (Type A) portland cement clinker and gypsum as follows, to produce an 80/20 "intergrind" sample.

| | |
|---|---|
| 2304 | grams pre-crushed cement clinker |
| 576 | grams minus 5 mm ash |
| 120 | grams gypsum |
| 3000 | grams Total |

Each "intergrind" sample was dry ground in a laboratory ball mill for 40 minutes. In each case, the fineness of the ground product was such that at least 85% passed through a 45 micron sieve.

To demonstrate the pozzolanic properties of the processed ash constituents in these examples, and the suitability of the cementitious materials produced in this manner, concrete testing was carried out on 4" cube specimens according to British Standard procedures. Concrete cube specimens were made in accordance with British Standard Specifications, using the eight cementitious materials as well as a ninth consisting of 100% Type A portland cement without any pozzolan.

These concrete specimens were cured at ambient temperature of 29° C. and crushed at 3, 7, and 28 days curing respectively, and in some cases, at 60 and 90 days curing, to determine the compressive strength of the specimens.

The compressive strengths of all specimens were plotted and curves drawn through the results at 3, 7, 28, 60 and 90 days curing, to illustrate the strength development of concrete made with the cementitious materials produced in these examples.

These strength development curves are shown in the graphs of FIGS. 4 and 5.

The numerals 1–7 and 9 in these two figures identify the compressive strength curves for the individual samples (Examples 6–13) as follows:

| NUMERAL | EXAMPLE |
|---|---|
| 1 | 6 |
| 2 | 13 |
| 3 | 7 |
| 4 | 8 |
| 5 | 9 |
| 6 | 10 |
| 7 | 11 |
| 9 | 12 |

Numeral 8 in the figures refers to the compressive strength curve of the reference material, 100% Type A portland cement with no ash constituents.

These graphs illustrate the pozzolanic properties of the ash constituents in the various cementitious materials, since the strengths obtained compared more favourably with that of the "Reference" material without any ash constituent as curing time increases.

It will be seen that the strengths of the cement specimens made with cementitious material containing processed ash, generally exceed that of the reference material without any ash constituent at 28 days curing, and in some cases at earlier curing ages.

These results indicate that satisfactory pozzolanic reactions were obtained between the cement and ash constituents, and that the cementitious materials produced in these examples, in which 20% or 30% of cement clinker was replaced by sugar mill boiler ash, were eminently suitable for the production of structural grade concrete.

EXAMPLE 14

Two samples of filter aid having similar filtering speed characteristics were prepared in accordance with Australian Patent Application No. PD 2067 from sugar mill boiler ash samples resulting from the burning of bagasse in the boilers of the "Rarawai" mill in the Fiji Islands, and the "Illovo" mill in South Africa. Such filter aids are referenced as Samples Nos. 066 and 129 respectively.

A 1 kilogram sample of sugar mill boiler ash from the "Rarawai" mill, was dry screened on a 150 micron sieve, the minus 150 micron fraction being designated as the former.

A 3 kilogram sample of sugar mill boiler ash from the "Illovo" mill was wet screened on a 212 micron sieve, the minus 212 micron fraction being dewatered by passing over a vacuum filter, so that the resulting product, designated as the latter, had a moisture content of 25.9%.

Comparative filtering tests were conducted to compare the performance of these mill ash filter aids samples Nos. 066 and 129 ("Mill Ash 1.0") with "Celite-Aquacel", a diatomaceous earth filter aid widely used commercially as a precoat filter aid for swimming pool filtration (and designated Sample No. 068).

The tests were conducted on a domestic "in ground" reinforced concrete swimming pool, 12 meters long by 5 meters wide. Water was drawn from a surface skimmer situated approximately 8 meters from the shallow end of the pool, and from a main floor drain in the deep end.

Water from both locations was combined and delivered through approximately 15 meters of nominal 1.5 inch PVC suction piping with six bends to a 0.92 HP Filtrite bronze centrifugal pump.

The pump delivered the raw water through a Filtrite filter unit, comprising eight filter leaves with a total net filtering area of 21 square feet of filter cloth supported on plastic frames (D.E. Filter).

The filter vessel was fitted with a pressure gauge which indicated the back pressure on the pump due to the filter and the nominal 1.5" PVC discharge piping returning filtered water to the pool.

Prior to each test run the filter was dismantled and thoroughly cleaned. The leaf basket at the skimmer box was cleaned regularly to avoid restrictions on the suction side of the pump. A total of 5 separate test runs were conducted with varying quantities of different filter aids, the duration of test runs varied from 18 hours to 122 hours.

A measured quantity of filter aid was taken and mixed with water to form a slurry. At the start of each test run the respective filter aid slurry was added slowly to the skimmer box so that the clean filter cloth was precoated with filter aid.

The quantities of the various filter aids, expressed in kilograms of dry material, used in each test were as follows.

| Test No. | Quantity of Filter Aid | Sample No. |
|---|---|---|
| 1 | 0.466 kg | 068 |
| 2 | 0.7145 kg | 068 |
| 3 | 1.429 kg | 068 |
| 4 | 0.7145 kg | 129 |
| 5 | 1.295 kg | 066 |

The quantity of filter aid used in test No. 3 actually corresponded with the recommendation of the filter aid manufacturer for the filter size used in the test (Johns Manville Ltd.).

During each test run the pump and filter unit were run for the total time shown in the graph of FIG. 6(6a-6c) with each cycle representing the period between startup and shutdown of the pump on separate days. The cycles on the figure marked with an asterisk (*) represent periods during Test No. 4 from the restarting of the pump to the stopping of the pump.

The pressure gauge readings were recorded at regular intervals throughout each test run and are shown graphically in the figure.

The average pressure increase during the first, second and third cycles for each of the tests was as follows:

| | AVERAGE PRESSURE INCREASE | | |
|---|---|---|---|
| Test No. | 1st Cycle | 2nd Cycle | 3rd Cycle |
| 1 | 0.17 lbs/in$^2$/hr | 0.2 lbs/in$^2$/hr | 0.33 lbs/in$^2$/hr |
| 2 | 0.33 lbs/in$^2$/hr | 0.15 lbs/in$^2$/hr | 0.22 lbs/in$^2$/hr |
| 3 | 0.77 lbs/in$^2$/hr | 0.58 lbs/in$^2$/hr | 0.20 lbs/in$^2$/hr |
| 4 | 0.12 lbs/in$^2$/hr | 0.08 lbs/in$^2$/hr | 0.08 lbs/in$^2$/hr |
| 5 | 0.51 lbs/in$^2$/hr | 0.12 lbs/in$^2$/hr | 0.11 lbs/in$^2$/hr |

Comparable use was made of the pool by swimmers during each test and sediment disturbed from the floor of the pool by sweeping to create comparable filtering loads in each test.

Chlorine was added at normal regular intervals to maintain residual chlorine at the desired level.

Excellent clarity of the filtered water returned to the pool was observed in all tests and specimens of the filtered water were collected during the third cycle in tests Nos. 2, 3 and 4 for turbidity determinations. The turbidity of each specimen of filtered water was measured using a HACH Nephelometric Turbidity Meter at the Research and Development Laboratory of Warman International Limited, as indicated by the double asterisk (**) next to "specimens of filtered water collected" in FIG. 6A. The results were recorded as follows:

| Test | TURBIDITY OF FILTERED WATER (N.T.U.'s) |
|---|---|
| 1 | Not measured. Appeared excellent. |
| 2 | 0.36 N.T.U.'s |
| 3 | 0.30 N.T.U.'s |
| 4 | 0.30 N.T.U.'s |
| 5 | Not measured. Appeared excellent. |

The results of the tests are shown in the figure and they indicate that filter aid produced from sugar mill boiler ash represented by samples Nos. 066 and 129 give comparable performance to the diatomaceous earth filter aid presently known in the art and typified by sample No. 068.

The results suggest longer life expectancy for the pre-coats of mill ash filter aids than for diatomaceous earth filter aids at smaller dosages and comparable life expectancy and filtrate quality for mill ash filter aids to that of diatomaceous earth filter aids when they are dosed in equal quantities by weight on a dry basis.

EXAMPLE 15

Introductory

As a basis for comparing filtering speeds, a standard procedure was adopted in which the rate of flow of a liquid through a bed of filtration material (filter aid) having a standard depth of 30 mm, in a column of water pressurized to a constant pressure of 35 kPa (5.0 lbs/sq in) was measured. This filtering speed was also measured under the same conditions for a standard grade of diatomaceous earth filter aid known in the art as Hyflo Super-Cel.

The diatomaceous earth was given a flow rate index of 1.0, and a flow rate index of other filter aids was calculated by a ratio of flow rates.

This example pertains to the development of a commercially viable process for producing and controlling various grades of filtration material (filter aids) from sugar mill boiler ash.

A sample of ash from the "Solitude" mill in Mauritius, designated Sample No. 074, was ground in a laboratory mill and screened (in a manner similar to the milling and classifying which takes place in a closed circuit wet grinding mill installation).

Sample No. 074 was wet ground for 5 minutes and the product wet screened through a 180 micron sieve. The over size was returned to the mill and wet ground for a further 10 minutes and the produce wet screened through a 180 micron sieve. The over size was returned to the mill and wet ground for a further 15 minutes and the product wet screened through a 180 micron sieve. The undersize material from each of these screening operations was combined and found to be 90% of the original unprocessed sample. This under size material was designated sample No. 118 and its Flow Rate Index was determined to be less than 0.1.

Sample No. 118 was then pumped with water through a 3" classifying hydrocyclone. This separated the finer particles smaller than 12 microns which were contained in the overflow from the hydrocyclone. The balance of the material contained in the underflow from the hydrocyclone was designated sample No. 123 and its Flow Rate Index determined to be 1.1.

To show the effect on Flow Rate Index of the proportion of very fine particles present, three further samples were prepared consisting of sample No. 123 with varying percentages of the minus 12 micron material from the overflow of the hydrocyclone added. The percentages of −12 micron material added to sample No. 123 were 5.75%, 2.5% and 1.0%—for combined samples designated sample Nos. 126, 127 and 128 respectively.

The Flow Rate Indexes for these samples were determined to be 0.12, 0.20, and 0.27 respectively.

These tests indicate that filtration material (filter aids) of various grades can be made by grinding and classifying unprocessed sugar mill boiler ash—to ensure that the processed ash is of a requisite upper particle size—by removing the very fine particles from the ground and classified product, by further classifying and by recombining various proportions of the fine particles previously removed to control the final grade.

If the above process is carried out on a wet basis and it is desired to reduce the moisture content the processed filter aid can be passed over a vacuum filter.

To demonstrate this Sample No. 123 was treated in a vacuum filter and the moisture content reduced to 20.0%.

If the filter aid is required in a dry state the filtered material can be dried to remove the moisture preferably using an indirect drying process so that the controlled particle size distribution is not disturbed by the loss of fine particles in the exhaust gasses of a direct type dryer.

In closing, it is reiterated that the preceding description is in the main intended to be merely illustrative of the invention. For example, where specific figures (e.g. percentages and percentage ranges) have been set forth, such figures are variable within the framework of (the successful attainment of) the object to be achieved. Overall, the foregoing should be sufficient to demonstrate that, by the invention, a substantial step forward in the art has been made.

I claim:

1. A process for manufacturing a pozzolanic material, comprising:
   procuring unprocessed bagasse ash,
   removing substantially all unburnt organic material from said ash, and
   reducing the particle size of the remaining ash so that the ash has a surface area of at least 300 square meters per kilogram.

2. A method for manufacturing a pozzolanic material according to claim 1, further including the step of removing inert material from said ash.

3. A method for manufacturing a pozzolanic material according to claim 2, wherein said inert material is removed prior to reducing the particle size.

4. A method for manufacturing a pozzolanic material according to either of claims 1 or 2, including the further step of removing charred fibers so as to reduce the carbon content of the ash below approximately 10% by weight.

5. A process for manufacturing a pozzolanic material according to any of claims 1–3, wherein said ash includes silica, aluminum oxide, and ferric oxide in a combined amount of at least about 70% by weight of said ash.

6. A process for manufacturing a pozzolanic material, comprising:
   procuring unprocessed bagasse ash, said ash being in the form of particulate matter including silica, aluminum oxide, and ferric oxide in a combined amount of at least 70% by weight of said ash,
   removing substantially all unburnt organic material from said ash,
   maintaining the carbon content of said ash below approximately 10% by removal of charred bagasse fibers when necessary,
   removing inert material from said ash, and thereafter reducing the particle size of the remaining ash so that the ash has a surface area greater than about 300 square meters per kilogram.

* * * * *